Feb. 23, 1937. R. A. NORBOM 2,071,355
VEHICLE FOR CARRYING DEMOUNTABLE BODIES
Filed Dec. 14, 1934 2 Sheets-Sheet 1
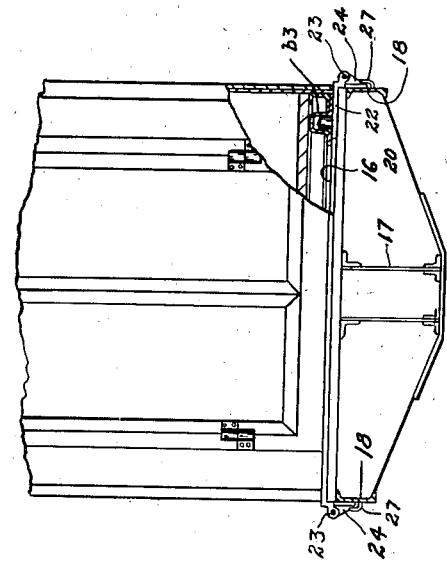
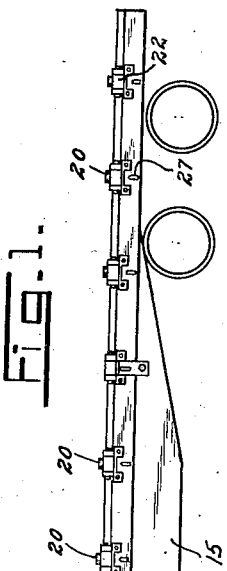
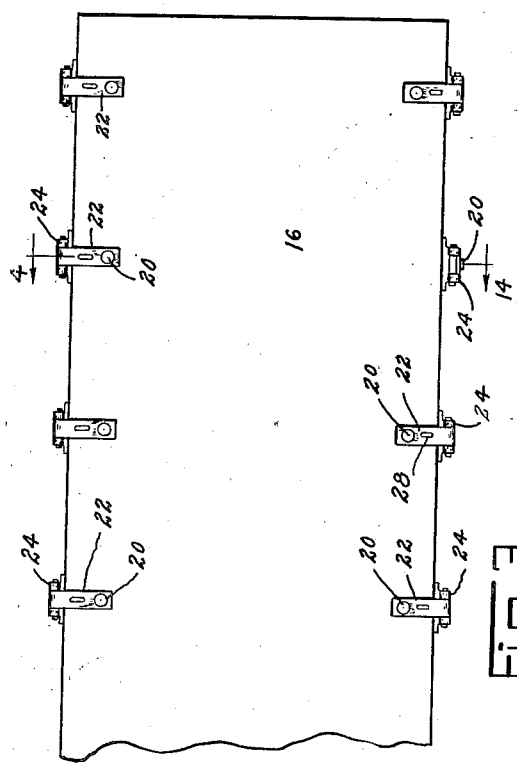
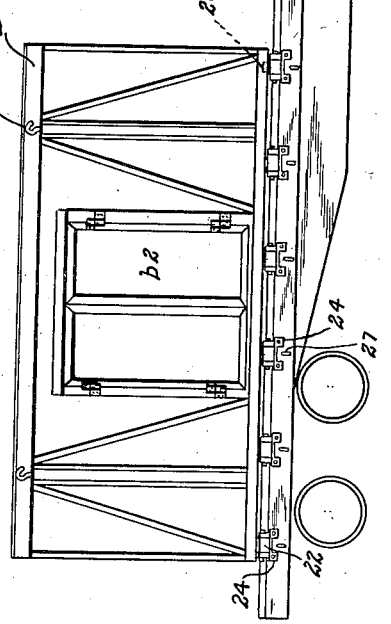
Inventor
Ragnar A. Norbom

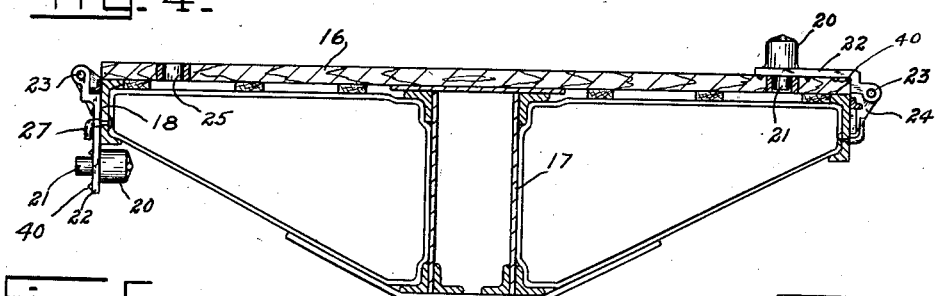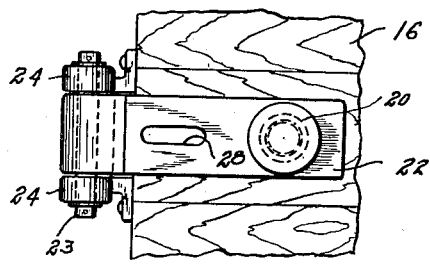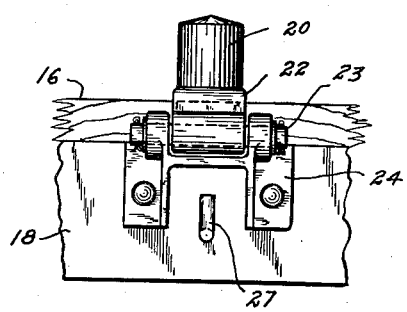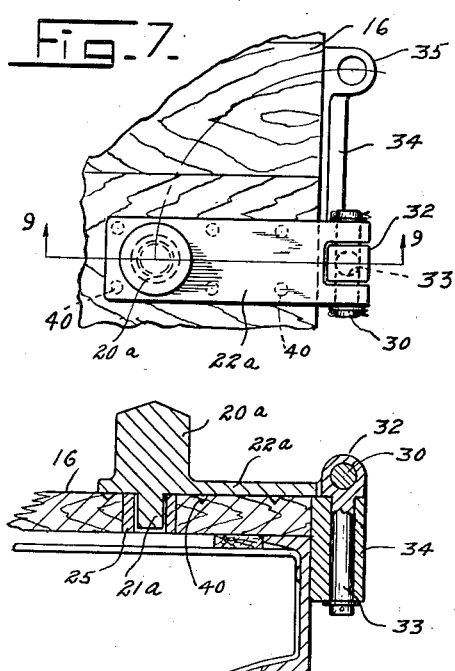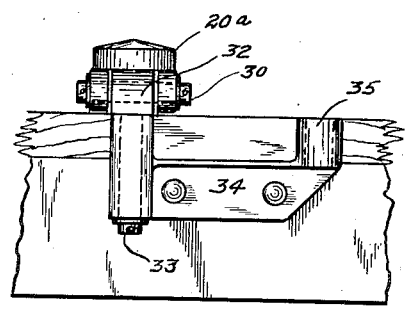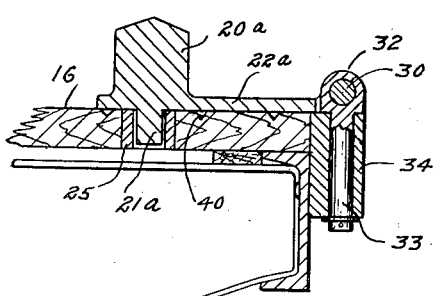

Patented Feb. 23, 1937

2,071,355

UNITED STATES PATENT OFFICE 2,071,355

VEHICLE FOR CARRYING DEMOUNTABLE BODIES

Ragnar A. Norbom, Clifton, N. J., assignor to Motor Terminals Company, New York, N. Y., a corporation of Delaware Application December 14, 1934, Serial No. 757,529

19 Claims. (Cl. 105—366)

This invention relates to mechanism to retain a demountable body on a suitable support, such as for instance, a vehicle adapted for the transportation of such a body. The invention is more particularly for use with a railroad flat car, adapted to support demountable vehicle bodies, and having positioners carried by the flat car to maintain the bodies in proper position thereon.

It is common practice in the art to employ positioning means for demountable bodies, such as are disclosed and claimed in Patent No. 1,772,939, issued August 12th, 1930, to my assignee. That patent discloses receptacles carried by a demountable body, adapted to fit over projections rigidly carried by a flat car or other supporting medium. While such a body positioning means is satisfactory for most uses, there are occasions when it is desirable to be able to move the projections carried by the flat car out of the way if freight other than that in a demountable body is to be carried on the car.

It has in general been an object of this invention to so devise a positioning member and means for carrying it by the transporting vehicle that when in its active position the member may project upwardly from the floor of the vehicle, but may, when desired, be moved to the side of the supporting surface, leaving the latter free for the direct carriage of freight.

More specifically, I provide a positioning member carried by a strap pivotally secured to the side of the vehicle in such manner that the strap and positioner may be swung into idle position leaving the floor unobstructed and without in any manner disturbing the parts of the vehicle itself.

It is a feature of my mechanism that the positioning devices when in their active position not only rest on the floor of the vehicle, but are positively interlocked therewith, so that the demountable body anchored by the positioning members becomes attached to the vehicle ready for transportation.

The features above referred to and others contributing to the efficiency of my body positioning system will become more apparent from the following specifications and the drawings, which are illustrative of preferred forms thereof. The essential novel features of the invention are summarized in the claims.

Referring now to the drawings, Fig. 1 is a plan of a railroad flat car, embodying the features of my invention and supporting thereon a demountable vehicle body; Fig. 2 is a sectional end elevation of such a railroad flat car, showing a demountable body positioned thereon, as indicated by lines 2—2 of Fig. 1; Fig. 3 is a plan of part of the surface of the railroad flat car shown in Fig. 1, indicating the position occupied by the body positioning members; Fig. 4 is a transverse section through such a railroad flat car, as indicated by the line 4—4 of Fig. 3; Fig. 5 is an enlarged, fragmentary plan of a portion of the vehicle flooring, showing a positioning member mounted thereon ready for use; Fig. 6 is a plan of such a member as it appears looking from the left toward the right of Fig. 5; Fig. 7 illustrates a modification of my invention, showing a body positioning member which may be swung horizontally clear of the vehicle load-carrying floor; Fig. 8 is an elevation of such a modified construction, as it appears when looking at Fig. 7 from the right; Fig. 9 is a section of the modification of Fig. 7, as indicated by the line 9—9 of that figure.

The drawings illustrate two forms of my invention shown respectively in Figs. 1 to 6 inclusive, and 7 to 9 inclusive. I will first describe the railway car itself and the demountable bodies which may be used with either form of positioning devices.

A suitable railroad flat car 15 having a flat top 16 supported by a box girder construction 17 along its center and at the edge by side channels 18 may readily incorporate the features of my invention. Such a flat car may be used to carry a demountable body B, having lift hooks b1 by which the same is placed on the car.

The body is provided along its undersurface with a plurality of sockets or receptacles b3, adapted to receive the projections or positioning members which by this invention may be mounted on the floor of the vehicle. These positioning members, indicated at 20 and 20a in the drawings, are preferably cylindrical blocks with somewhat conical tops to cooperate with the sockets in the body. The positioning members are also provided with downwardly projecting stud portions 21 and 21a which are adapted to occupy thimbles 25 set into the floor of the vehicle so that the positioner becomes interlocked therewith.

It is important that the positioning devices 20 or 20a shall not only be removable from the flat surface 16, but shall at all times be carried by the car to prevent their inadvertent loss when not in use. I accomplish this by hingedly carrying the positioners in such manner that they may be swung clear of the floor surface of the car 15.

In one form of my invention I revolve such positioning members about a horizontal hinge axis through an angle of approximately 270 degrees from an active to a depending idle position along the sides of the car. To this end, as shown in Figs. 1 through 6 inclusive, each positioner 20 is carried by a strap 22 which in turn is pivotally carried as at 23 by an arm 24 rigidly fastened to the side of the car 15.

It will be noted from Fig. 4 that the pivot 23 lies to one side of and below the flat top 16 of the car. While this requires a somewhat peculiar construction of the strap 22 adjacent the pivot 23, as shown in Fig. 4, it also results in the entire positioning device lying below the surface 16 when inactive and thus it is possible to place a body on the car 15 which has substantial overhang. It should be noted that the hole 25, adapted to accommodate the end 21 of the positioner 20, is of such diameter that the member 21 may be freely swung in and out of the hole when rotated about the pivot 23.

A latch 27, as shown in Figs. 4 and 6, is provided to retain the positioner 20 and the strap 22 against the side of the car 15 when in an inactive position. The latch is L-shaped and mounted rotatably about a horizontal axis and carried by a channel 18 of the car 15. A slot 28 is cut in the strap 22, as shown in Fig. 5. When the L-shaped latch 27 is rotated into its uppermost position, the strap 22 and the positioner 20 fastened thereto may be rotated about the pivot 23 from the position shown in the right-hand of Fig. 4 to that position shown in the left-hand of that figure. The strap 22 passes over the latch 27 to lie flat against the channel 18 of the car. When this position has been reached, the latch 27 is turned 180 degrees to its downmost position, at which time it overlies the strap 22 and prevents the same from being moved out of an inactive position.

A modified form of my invention permits the rotation of the positioner 20 about a vertical axis to an inactive position. This modification, which is shown in Figs. 7, 8, and 9, makes use of the aforementioned positioner 20a, having its lower end 21a adapted to fit a thimble 25 mounted in the car floor in a similar manner to that of my preferred form.

This modified form of construction is so arranged that the positioning device 20a is not only pivoted horizontally, but is also pivoted vertically. To free the end 21a of the positioner 20 from the thimble 25a, it is necessary to lift the positioner clear of the surface of the top 16 of the car. This is accomplished by raising the strap 22a to which the positioner is fastened about the horizontal pivot, which is formed by a suitable pin 30 passing through both the U-shaped end of the strap 22a and the strap supporting member 32.

When the positioner 20a has been lifted clear of the car top, it may be swung horizontally approximately 90 degrees when it will assume an inactive position at the side of the car. Such rotation is permissible by reason of the cylindrical end 33 of the member 32, which is rotatably carried in the fixture 34, which in turn is fastened to the frame of the car 15. The member 34 extends lengthwise along the car side and at a distance from the vertical axis of the member 32, which is equivalent to the effective length of the strap 22a and is provided with a receptacle 35. When the positioner 20a has been completely swung to an inactive position, the end 21a is allowed to drop into the receptacle 35 and thus retain the device in an idle position.

It will be noticed from Figs. 4 and 9 that the straps 22 and 22a are provided with prongs 40 on their undersides. I regard these as preferable, especially when the device is used with cars having wooden floors, as by imbedding themselves in the floor they eliminate any slight longitudinal shifting of the strap which might result from the clearance between the downward studs of the positioners and the floor sockets.

It will be seen from the foregoing description that I have provided a novel means for retaining a demountable body on a suitable transporting vehicle. It will further be apparent that I have provided retaining devices for a demountable body that may be rendered active or inactive as desired. Such positioning devices are so constructed that when inactive they do not obstruct the effective surface of the vehicle on which they are used, thus permitting the use of such surface in the transportation of objects which would be difficult to handle if the positioners were rigid with the car body.

I claim:

1. The combination of a vehicle having a load carrying surface and a set of projections attached to the vehicle in such manner that each projection may be moved independently of the others and is adapted to be positioned with respect to said surface to extend upwardly therefrom so as to occupy a socket in a demountable body, and, selectively, to be removed laterally from said position so as to occupy an idle position beyond the edge of said surface.

2. The combination of a vehicle having a flat load-carrying surface with sockets therein, load positioning members pivotally carried by said vehicle at the side of said load-carrying surface, said positioners being adapted to lie on said load surface partially within respective sockets to engage a demountable body carried by the vehicle, and to be moved to the side of said vehicle into a position clear of said flat surface and below the plane thereof.

3. The combination with a vehicle having a flat load-carrying surface, of rigid straps hingedly carried at the side of said surface, load positioning members rigidly fixed to the free ends of said straps respectively, said straps being swingable about their pivots to selectively dispose the positioners on the body surface in an active position, and at the sides of the flat surface in an inactive position.

4. The combination with a vehicle having a load-carrying surface, of a strap hingedly carried at the side thereof on a fixed horizontal hinge axis, whereby the strap may be swung in a vertical plane from an active position on the flat vehicle surface to a depending inactive position at the side thereof and a positioner adapted to securingly engage a demountable body carried on the free end of said strap.

5. The combination of a vehicle with a flat load-carrying surface having sockets therein adjacent an edge, a plurality of rigid straps each carried on a horizontal hinge axis at the side of the vehicle, load positioning members having a shank adapted to enter the respective sockets and carried by the free ends of the straps, said straps being movable to cause respective shanks to enter the sockets and place the positioners in an upright location whereby they may engage a demountable body, said straps being movable about their axes to locate the positioners in an inactive position with respect to the flat vehicle surface.

6. The combination with a railway flat car of a bracket secured to the side of the car adjacent the floor surface, a strap hinged to the upper end of the bracket on a horizontal axis, said strap being adapted selectively to lie horizontally on top of the floor and be turned over to depend substantially vertically at the side of the car, a projection on the face of the strap adapted to extend vertically when the strap lies on the floor surface and to extend inwardly when the strap depends at the side of the car, and a latch adapted to hold said strap in its depending position.

7. In a vehicle adapted to carry a demountable body and having a flat load-carrying surface, the combination of a strap hingedly mounted to swing about a vertical hinge axis at one side of the load-carrying surface, whereby the strap may be selectively moved to an active position overlying said surface, and to an inactive position at the side thereof, and a positioner for such body fixedly carried by the free end of the strap.

8. In a vehicle having a flat load-carrying surface, the combination of a set of projections adapted to position a demountable body, movable mountings for said projections connected with the vehicle and adapted to rest on said surface to position the projections to engage a demountable body in one position of the mountings and entirely removed from above the plane of said surface and carried by the vehicle in another position of the mountings.

9. In a vehicle having a substantially flat load-carrying platform surface with substantially unbroken margins, a movable positioner adapted to hold a demountable body on such platform, means fixed to the platform and horizontally operatively interlocking with the positioner to hold the same against all longitudinal and transverse movement relative to the vehicle when the positioner is disposed over said platform for operation as stated, and additional means mounting the positioner on the vehicle and operable to move the positioner from interlocking engagement with said first-named means to a carrying position laterally beyond said margins of the platform.

10. The combination of a vehicle having a load-carrying surface with upwardly facing sockets therein and projections movably attached to the vehicle and adapted to be positioned partially within said sockets and securingly engage a demountable body, said positioners being removable from said surface in a manner to clear the same for a different load.

11. The combination with a vehicle having a flat load carrying surface, straps hinged to the edge of the vehicle, load positioners mounted on the straps, said positioners being operatively positionable by the straps in load engaging position over the surface, and to be swung laterally to inactive positions at the sides of the surface.

12. In a vehicle adapted to carry a demountable body on a flat load-carrying surface, the combination of a socket depending below said flat surface, a strap hingedly mounted on the vehicle to swing about a horizontal hinge axis lying below said flat surface and at one side thereof, a positioner for such body carried by the free end of the strap and having a shank adapted to enter the socket when in an active position, a slot in the strap extending lengthwise thereof, and a latch carried by the body and adapted to engage the slot to lock the strap in a depending inactive position below said load-carrying surface.

13. The combination with a vehicle having a load-carrying surface, of a load positioner hingedly mounted to swing about intersecting axes so arranged that the positioner may swing in vertical and horizontal planes, said positioner being movable about the horizontal hinge axis until it stands above the load-carrying surface and then being movable about said vertical hinge axis to an inactive position at one side of said surface.

14. The combination of a vehicle having a flat load carrying surface, positioning members pivotally carried by said vehicle on fixed pivot axes at the side of the load carrying surface and being swingable outwardly to clear said surface, said positioning members being adapted to be supported on the load carrying surface and engaged therewith so as to prevent longitudinal shifting of the positioning members, and when so supported being adapted to engage and position a container above the load carrying surface.

15. The combination of a vehicle having a flat load carrying surface, a strap adapted to overlie said surface and hingedly mounted to swing about a horizontal hinge axis at one edge of said surface, a demountable body positioner rigidly carried by the free end of said strap and adapted to engage and position such body when the body is over said load carrying surface, an opening through said strap, and a latch member carried by said vehicle body adapted to pass through said opening to lock the positioner in a depending position at the edge of said surface.

16. The combination with a vehicle having a flat load-carrying surface with a socket therein, of a strap hingedly mounted to swing about vertical and horizontal axes, whereby said strap may move in a vertical and a horizontal plane, a positioner carried by the free end of the strap and having a depending shank adapted to enter said socket, said positioner being adapted to engage and position a container above the load-carrying surface and being movable about the horizontal hinge axis until said shank stands above the socket and being movable about said vertical hinge axis to an inactive position at the side of said load-carrying surface.

17. In a vehicle adapted to carry demountable bodies and having a flat load-carrying surface, the combination of a strap movably secured to the vehicle, a positioning member carried by the free end of said strap and having a depending shank, said positioning member being adapted to engage and position a container above the load carrying surface, a socket carried by said flat surface adapted to receive the shank, in which position the positioner is located actively with respect to the load carrying surface, a second socket at the side of said surface also adapted to receive the shank, in which position the positioner is inactive.

18. In a railroad flat car adapted to transport demountable bodies and having a flat load-carrying surface, the combination of a plurality of sockets set into the floor of the car and a plurality of sockets spaced along the sides of said car, a plurality of straps each hingedly carried adjacent the corresponding sockets to swing about a hinge axis located beyond the flat surface of said car, and a positioner rigidly carried by each strap adjacent the free end and having a depending shank adapted to enter said sockets, said straps being movable about their respective hinge axes whereby the positioner may be held by the sockets in an active or an inactive position, said positioning member, when in active position, being adapted to engage and position a container above the load-carrying surface.

19. The combination with a railway flat car of a fitting secured to the side thereof and carrying a vertical tubular bearing, a pin swivelled in said bearing, a strap hinged to the pin and adapted to occupy an active position in which it lies on the floor surface of the car in face to face contact therewith, the strap being swingable laterally of the car to an inactive position in which it clears the floor surface, and a positioner on the strap extending upwardly therefrom in the active position of the strap, said positioning member, when in active position, being adapted to engage and position a container above the load-carrying surface.

RAGNAR A. NORBOM.